United States Patent [19]
Arikawa et al.

[11] 3,840,170
[45] Oct. 8, 1974

[54] AUTOMATIC, CIRCUMFERENTIALLY TRAVELING MECHANISM FOR USE IN AUTOMATIC CIRCUMFERENTIAL WELDING OR CUTTING DEVICE

[75] Inventors: Masayasu Arikawa; Minoru Oishi; Hidenori Watanabe, all of Fujisawa; Shou Horiuchi; Katsuaki Hatano, both of Kamakura, all of Japan

[73] Assignee: Kobe Steel Limited, Kobe, Japan

[22] Filed: Feb. 5, 1973

[21] Appl. No.: 329,409

[30] Foreign Application Priority Data
Feb. 5, 1972   Japan.............................. 47-15190

[52] U.S. Cl................ 228/29, 30/97, 219/60 A, 219/125, 228/32
[51] Int. Cl............................................ B23k 9/00
[58] Field of Search.................. 228/29, 45, 25, 32; 266/23 K, 23 M; 219/60 A, 125; 29/484; 269/287; 30/95, 97

[56] References Cited
UNITED STATES PATENTS

| | | | |
|---|---|---|---|
| 3,095,501 | 6/1963 | Jaekler et al. | 228/45 X |
| 3,102,187 | 8/1963 | Coscia | 219/60 A |
| 3,555,239 | 1/1971 | Kerth | 219/125 R |
| 3,604,612 | 9/1971 | Miller et al. | 228/29 X |
| 3,678,239 | 7/1972 | Hill | 228/45 X |
| 3,702,913 | 11/1972 | Kazluaskas et al. | 228/45 X |
| 3,722,778 | 3/1973 | Rohrberg et al. | 228/29 X |
| 3,764,777 | 10/1973 | Sakabe et al. | 228/45 X |

Primary Examiner—J. Spencer Overholser
Assistant Examiner—Robert J. Craig
Attorney, Agent, or Firm—Oblon, Fisher, Spivak, McClelland & Maier

[57] ABSTRACT

This disclosure relates to an automatic circumferentially traveling mechanism for use in an automatic circumferential welding or cutting device which is adapted to automatically weld or cut a cylindrical body along a circumferential line thereof. The combination of a welding or cutting device provided with magnetic rollers and flexible bodies which are adapted to guide the body of the welding or cutting device make easier the automatic welding or cutting operation, which has heretofore been of a time-consuming nature, and provides the achievement of such with a mechanism which is light in weight and well suited for such an operation.

6 Claims, 4 Drawing Figures

PATENTED OCT 8 1974

AUTOMATIC, CIRCUMFERENTIALLY TRAVELING MECHANISM FOR USE IN AUTOMATIC CIRCUMFERENTIAL WELDING OR CUTTING DEVICE

BACKGROUND OF THE INVENTION

This invention relates generally to an automatic, circumferentially traveling mechanism which is designed for use in the automatic circumferential welding or cutting of a cylindrical body, such as a steel pipe pile.

Heretofore, in most welding or cutting operations of steel pile at a working site, it has been necessary to resort to manual means and, particularly in the case of welding, a semi-automatic welder has been used at best to mechanize such a system. Thus, only a few types of automatic welding devices have recently come to the fore.

According to the conventional devices of such character there is provided a split-type ring which is adapted to be mounted co-axially with and along the outer periphery of a body to be welded or cut, this ring being in engagement by means of an epicyclic gear with a welding or cutting device. In the case of a welding operation, however, a welding wire feeding device is so designed as to travel along the ring. For this reason, when mounting a welding or cutting device on a body to be welded or cut, two different operations are required, namely one operation for mounting the ring on the body to be welded or cut and a subsequent operation for mounting a welding or cutting device on the ring, such that a great deal of time and a lowered efficiency in the mounting operation of a welding or cutting device results as compared with the time required for arc developing duration or a cutting operation.

Furthermore, in the case of welding or cutting a body which is of a cylindrical shape and which has a diameter of over 1 meter, there results an increased weight of the ring being used, such that the removal operation thereof in turn requires manpower in excess of a single operator. In addition, the adjusting operation required for attaching a ring in parallel with a cutting or welding line would become complicated and even more time-consuming.

Even further, while the operation for coaxially mounting a ring on a body to be welded or cut is complicated, yet in the case of non-coaxial application, the target point of a wire or a direction of welding is liable to be deviated from the predetermined path or point as the welding or cutting operation proceeds. On the other hand, there has been proposed a welding or cutting device in which a chain is trained around the body to be welded or cut while a wheel is mounted on a welding or cutting support in such a manner that the wheel is in meshing engagement with the chain, whereby the rotational motion of the wheel will move such a device along the circumference of the body to be welded or cut. Although such a device can be said to be an improvement over the aforementioned art, there has remained certain drawbacks in that the mounting or removal operations of such a device also require manpower in excess of a single operator, and thus are too time-consuming. It is readily apparent also that a body to be welded or cut, which has a great diameter, would require a chain which is extremely heavy, thus rendering the application even more difficult.

To make the matter worse, the conventional rings are heavy in weight and, as a result, more than two operators are needed for mounting the ring on a steel pipe to be welded or cut, and thus much more handling time is required as compared with the actual welding time.

Still further, the conventional rings themselves are of such unfavorable construction requiring much time and effort for attachment, removal or adjustment, and are of a considerable mass and of a diameter considerably greater than that of a pipe to be welded, yet they still fail to compensate for variations in the circumferential length of a pipe.

SUMMARY OF THE INVENTION

Accordingly, this invention contemplates to avoid such drawbacks in the prior art devices heretofore proposed, and thus an object of the invention is directed to the achievement of welding or cutting of a cylindrical body with extreme ease and by simple operations.

It is another object of the invention to provide a mechanism which permits the positive movement of a welding or cutting device around the circumference of a body to be welded or cut.

It is a further object of the invention to provide a mechanism which can accurately follow and move along the circumferential surface of a body to be welded or cut, despite the tolerance of the body (the tolerance inherent to an individual product), when a welding or cutting device moves along the circumference of a body to be welded or cut.

The foregoing objectives are attained, according to the present invention, through the provision of an automatic, circumferentially traveling mechanism which comprises one or more welding or cutting devices provided with a plurality of magnetic rollers, at least one of which is a self-rotating type and adpated to transmit a driving force, being adapted to self-travel around the circumference of a body to be welded or cut, and one or more flexible bodies both ends of which are attached to the welding or cutting devices and adapted to be trained tightly around the circumference of the body to be welded or cut. The flexible bodies of automatic, circumferentially traveling mechanism of the invention are also provided with a plurality of rollers spaced an appropriate distance to permit smooth self-traveling thereby. In addition to this, the provision of the flexible body, whose ends may be attached by way of extensible joints to the body of the welding or cutting device, permits more accurate mounting of the welding or cutting device on the body to be welded or cut, despite the tolerance of the surface thereof.

According to another aspect of the invention, at least one magnetic roller is provided having a groove running circumferentially thereof, which groove is adapted to fit over a guide rail fixed on the body to be welded or cut, thereby permitting more accurate movement of the welding or cutting device.

According to a further aspect of the invention, the flexible body is wound around the body to be welded or cut, such that the body of the welding or cutting device may be prevented from running off the guide rail and may accurately follow and move along the circumferential surface of the body to be welded or cut, despite the tolerance of the body being welded or cut.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several figures, and wherein.

DETAILED DESCRIPTION OF THE ILLUSTRATED EMBODIMENTS

Figure 1:
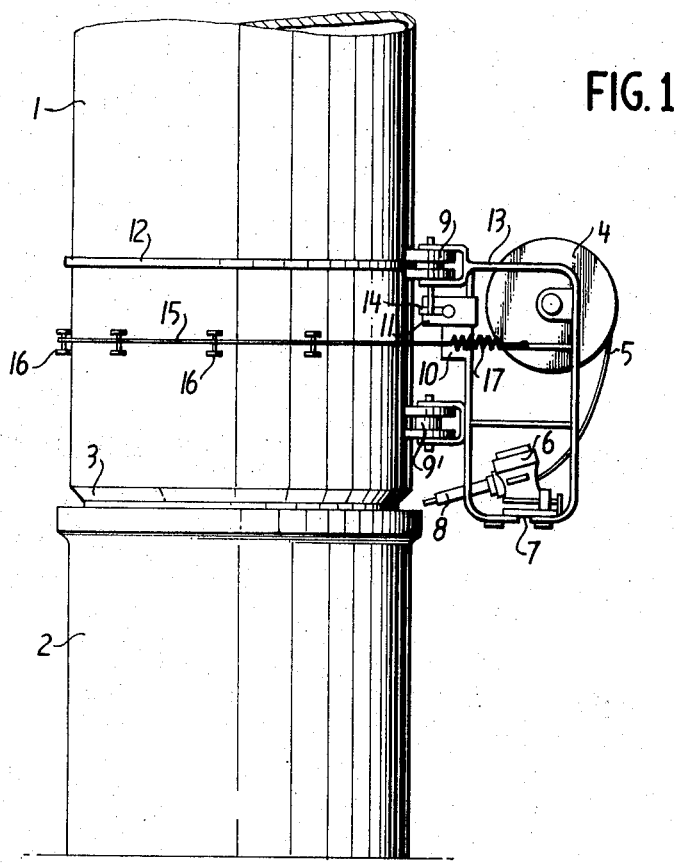
FIG. 1 is a plan view of a welding device embodying the present invention.

One embodiment of the invention will now be described by way of a fundamental example of a steel pipe pile with reference being made to the drawings. However, in the ensuing description, only a welding case will be described, because there is no difference between the welding device and the cutting device except that in one case a welding torch is used and in the other a cutting equipment is employed.

Shown at 1 and 2 is a steel pipe pile having cutting edges extending in a substantially horizontal direction, and at 3 is a circumferential weld groove. A welding wire reel 4 is rotatably mounted on a body frame 13 of a welding device. A welding wire 5 is fed by a motor 6 to a welding torch 8. A wire feeding unit 7 for the wire feeding motor 6 and a feeding gear are affixed to the lower portion of the body frame 13 of the welding decice. The welding torch 8 is adapted to guide the welding wire 5 from the wire reel 4 to the weld groove 3, with the tip thereof serving to supply electricity to the wire.

Figure 3:
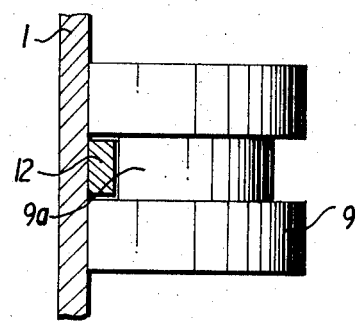
FIG. 3 is a view partly in cross-section showing the engagement of a magnetic roller with a guide rail.

A plurality of magnetic rollers generally shown at 9 and 9', each defining grooves 9a, as shown in FIG. 3, are shown located at the upper and midway portions of the body frame 13 of the welding device, the upper magnetic rollers 9 mounted on the frame 13 being designed to be rotated through a reduction gear 11 by a gear transmission mechanism 14 which is driven by a drive motor 10. The magnetic rollers 9 are also designed to roll along a guide rail 12 mounted around the steel pipe pile 1.

In addition, a wire rope 15 having rollers 16 affixed thereto and spaced apart a predetermined distance is wound around the outer periphery or circumference of the body to be welded. One end of wire rope 15 is affixed via a compression spring 17 to the body frame 13 of the welding device, while the other end is affixed via a turnbuckle 18 to the frame body. In passing, the compression spring 17 serves to exert a tension force to the wire rope 15 being wound around the pile.

In the case of a welding device being mounted on the steel pipe pile 1, the upper magnetic rollers 9 are mounted on the rail 12 on the pipe pile 1 with the grooves 9a thereof being fitted over an upstanding portion of the guide rail 12, so as to hold the body frame 13 of the welding device positively. Then, one end of the wire rope 15 is connected to one of the attaching portions of the frame 13 and led one turn around the circumference of the steel pipe being eventually connected at the other one of the attaching portions of the frame 13. Then, the turnbuckle 18 is adjusted to tighten the wire rope 15. In this manner, the mounting of the welding device is completed, and then the wire feeding motor 6 and the magnet-roller-driving motor 10 may be set into operation, thereby feeding the welding wire 5 from the welding torch 8 to the weld groove 3 while developing an arc therebetween. Simultaneously therewith, the body frame 13 of the welding device will travel by means of the magnetic rollers 9 along the guide rail 12 wound around the circumference of the steel pipe pile 1 to initiate the continuous welding. At this time, the wire rope 15 wound around the outer periphery of the pipe will smoothly be shifted around the pile at the same speed as the frame body 13 with the aid of the rollers 16 mounted on said wire rope 15. This provides an intimate contact of the magnetic rollers attached to the body of the welding body 13 with the surface of the steel pipe 1 so as to prevent any decrease in the adsorption force of the magnetic rollers due to an uneven surface condition or adhesion of rust or mud thereon, that is, to prevent any decrease in the driving force as well as to keep the welding device from slipping off the body. The preferred attaching position of the wire rope 15 to the body of the welding device is slightly above the center of gravity of the body of the welding device in the case of a pile which is vertically arranged while such a position is preferably located in close vicinity to the center of gravity in the case of a pile which is horizontally arranged.

As is apparent from the foregoing description, the automatic, circumferentially traveling mechanism of the invention comprises a welding device body 13 being provided with a pair of lower magnetic rollers 9' and a wire rope 15, and upper auxiliary magnetic rollers 9 adapted to be rotatingly fitted on a guide rail 12 which is mounted around a steel pipe pile 1, utilizing the magnetic force of the upper two magnetic rollers 9. Thus, this permits ready mounting of the welding device on a body to be welded simply by mounting the welding device on the guide rail with the upper magnetic rollers 9 being fitted on the guide rail 12 by one operator. In addition, this avoids the former difficulties encountered in the conventional devices, in that a massive ring had to be mounted co-axially with and around the body to be welded, while maintaining parallelism with the welding line. Even in such applications where such a ring is not required, this invention avoids the problem of more than one operator being required to wind a chain and mount the welding device in place. Another advantage of the invention is that a wire rope of light weight can be used, one end of the wire rope being secured to one end of the frame, using a hook, and then around the outer periphery of the pipe being eventually secured to the other end of the frame by means of a hook, after which the wire rope is tightened as by using a turnbuckle. The advantage in the combined use of the magnetic rollers with the wire rope is to render effective both functions thereof and to provide a magnetic roller of greatly reduced weight, thus increasing the mobility of the welding device. The following table compares the operating hours required for both the conventional type welding device and that of the present invention:

```
A steel pipe pile . . . diameter 609 mm
                        wall thickness 12.7 mm
         welding wire:  wire with non-gas flux . . . 2.4 mm
    welding conditions: amperage 350 to 400 A
                        voltage 24 to 28 V
```

| Items of Operations | Time Required | |
|---|---|---|
| | Prior Art | Present Invention |
| mounting of a guide rail and adjustment of welding wire | 9 min. | 2 min. |
| attachment of welding device | 2 min. | 30 sec. |
| attachment of wire rope | — | 30 sec. |
| welding operation | 15 min. | 15 min. |
| removal of the welding device | 2 min. | 30 sec. |
| removal of wire rope | — | 30 sec. |
| Total Operating Hours | 28 min. | 19 min. |

Figure 4:
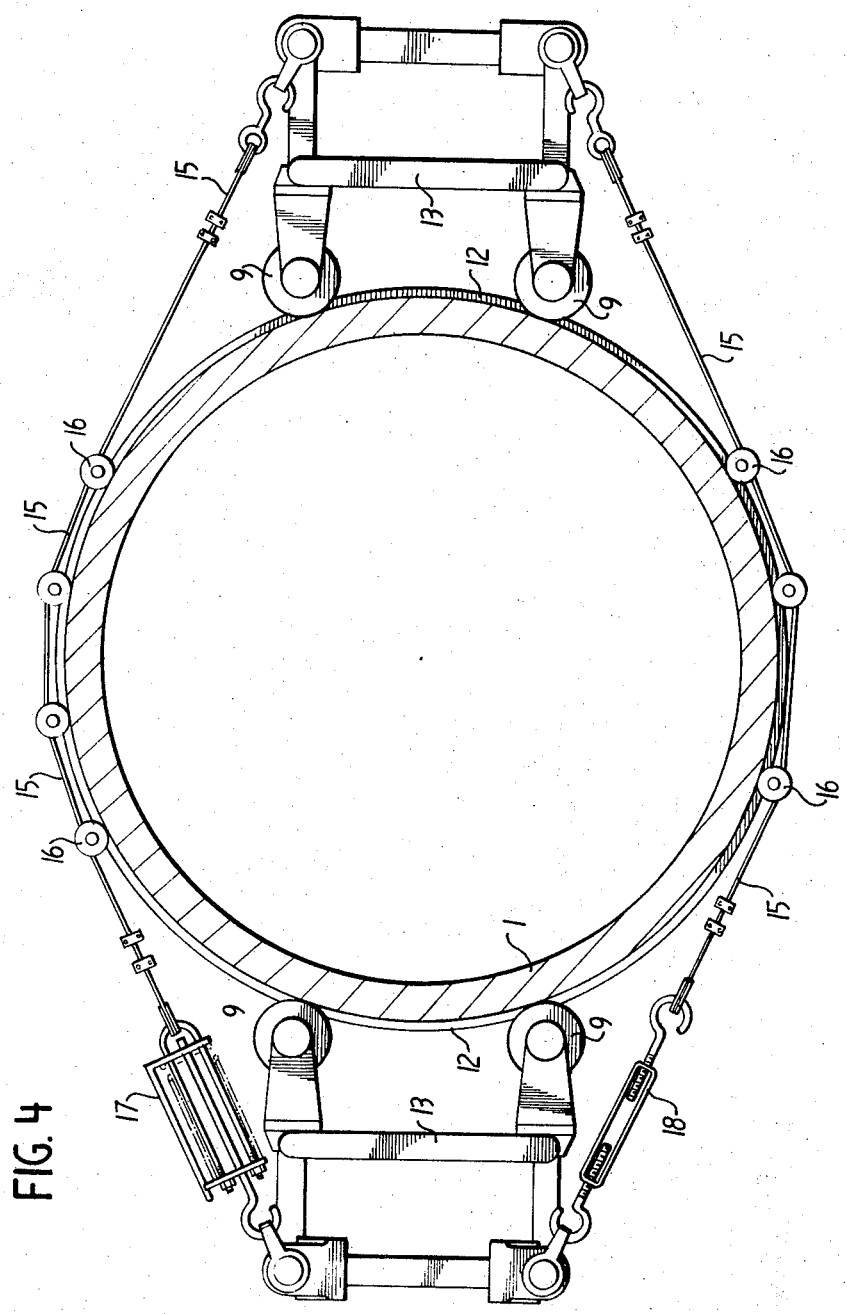
FIG. 4 is an end view of another emobdiment according to the present invention.

The present invention is also applicable to an operation using two or more of the welding or cutting devices for one body to be welded or cut, as shown in FIG. 4. In the embodiment in FIG. 4, two welding or cutting devices 13 are provided around one body 1 to be welded or cut, as the case may be, and they are connected by two flexible bodies 15 wherein the reference numbers are the same as those in FIGS. 1, 2 and 3.

The above table well explains that only 60 percent of the operating time required for the conventional device is sufficient, and that two operators are required for attaching the mechanism when resorting to a conventional device, whereas only one operator is necessary for accomplishing the whole operation with the present invention.

Figure 2:
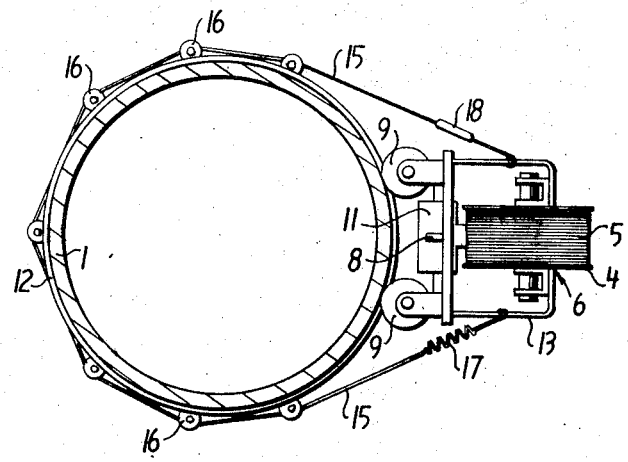
FIG. 2 is a side elevation of the welding device of the invention.

Referring now to the cutting operation of the cylindrical pile according to the present invention, a welding wire reel 4 and a welding wire 5, as used in the welding device shown in FIGS. 1 and 2, are not necessary for the cutting device, which only requires a cutting equipment in place of the welding torch 8. The other mechanisms of a cutting device are entirely the same as those of the welding device. The operational procedures are also the same between the two and so are the functions and advantages. Accordingly, the mechanism of the present invention is likewise applicable to a cutting device as well as to the welding device.

In summary, the present invention is not limited to the application described, such as for circumferentially welding or cutting a steel pipe pile, placed only in a horizontal position, but to a vertically positioned steel pipe pile, and also other cylindrical bodies which require circumferential welding or cutting, and thus the industrial value of the mechanism of the present invention is of great magnitude.

Obviously, many modifications and variations of the present invention are possible in light of the above teachings. It is to be understood therefore that within the scope of the appended claims, the invention may be practiced otherwise than as specifically described herein.

What is claimed is new and desired to be secured by letters patent of the United States is:

1. An automatic, circumferentially traveling mechanism for use in the automatic circumferential welding of a body having a substantially cylindrical configuration, comprising:

at least one welding device adapted to self-travel around the circumference of said body to be welded, said at least one welding device being provided with a plurality of magnetic rollers, at least one of which is adapted to rotate so as to transmit a driving force and at least one of which is provided with a circumferential groove therein;

at least one flexible body adapted to be wound and tightened around the circumference of said cylindrical body to be welded with both ends of said body being removably secured to said at least one welding device; and a guide rail mounted around the circumference of said cylindrical body to be welded and being designed to be received in said circumferential groove of said at least one magnetic roller, whereby said magnetic roller moves around said cylindrical body on said guide rail.

2. An automatic, circumferentially traveling mechanism as defined in claim 1, wherein said at least one flexible body is provided with a plurality of rollers.

3. An automatic, circumferentially traveling mechanism as defined in claim 2, wherein the ends of said flexible body are secured by extensible joints to said at least one welding device.

4. An automatic, circumferentially traveling mechanism as defined in claim 1, wherein said at least one welding device is a plurality thereof being connected by a plurality of flexible bodies.

5. An automatic, circumferentially traveling mechanism as defined in claim 3, wherein one of said extensible joints is a compression spring.

6. An automatic circumferentially traveling mechanism as defined in claim 3, wherein the other of said extensible joints is a turnbuckle.

* * * * *